United States Patent
Froehlich et al.

(10) Patent No.: US 8,849,800 B2
(45) Date of Patent: Sep. 30, 2014

(54) SYSTEM AND METHOD OF FORWARDING END USER CORRELATED USER AND CONTROL PLANE OR NETWORK STATES TO OSS SYSTEM

(75) Inventors: Robert William Froehlich, McKinney, TX (US); Lisan Lin, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 2630 days.

(21) Appl. No.: 11/230,019

(22) Filed: Sep. 19, 2005

(65) Prior Publication Data

US 2007/0067264 A1    Mar. 22, 2007

(51) Int. Cl.
*G06F 17/30* (2006.01)
*H04L 29/08* (2006.01)
*H04L 29/14* (2006.01)

(52) U.S. Cl.
CPC .............. *H04L 67/22* (2013.01); *H04L 69/40* (2013.01); *H04L 67/04* (2013.01)
USPC ......................................................... 707/722

(58) Field of Classification Search
USPC ......................................................... 707/722
See application file for complete search history.

(56) References Cited

U.S. PATENT DOCUMENTS

| | | | | |
|---|---|---|---|---|
| 6,012,152 A | * | 1/2000 | Douik et al. | 714/26 |
| 2002/0064149 A1 | * | 5/2002 | Elliott et al. | 370/352 |
| 2003/0134648 A1 | * | 7/2003 | Reed et al. | 455/456 |
| 2004/0220925 A1 | * | 11/2004 | Liu et al. | 707/3 |

* cited by examiner

*Primary Examiner* — Hosain Alam
*Assistant Examiner* — Johnese Johnson
(74) *Attorney, Agent, or Firm* — Edwards Wildman Palmer LLP; Scott D. Wofsy; George N. Charles

(57) ABSTRACT

A system is described for collecting data records which have been correlated to subscriber, or end user, access network, core network, transport network, and application service information, referred to as end user correlated data records and utilizing those records in a wireless or wireline network to identify and address correctable conditions in a network, such as a wireless or wireline network. The system includes at least one probe in the network which is able to monitor network activity and provide detailed data records on that activity. These data records are sent to a mediation device that correlates those data records with subscriber and/or location data, to create the end user correlated data records. An intelligent application services device takes the end user correlated data records and examines the records to determine if there are any correctable conditions in the network or the end user devices.

27 Claims, 2 Drawing Sheets

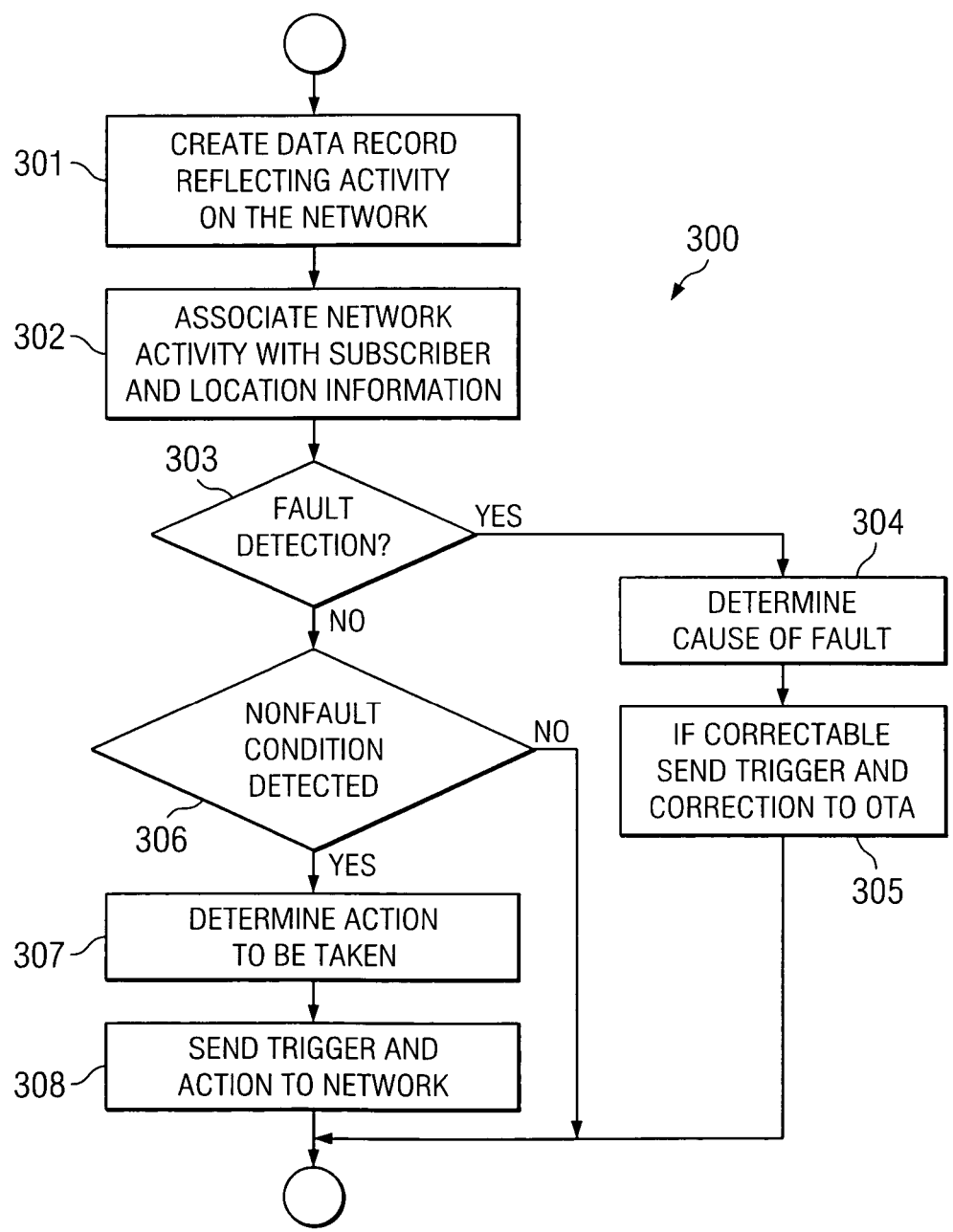

SYSTEM AND METHOD OF FORWARDING END USER CORRELATED USER AND CONTROL PLANE OR NETWORK STATES TO OSS SYSTEM

CROSS-REFERENCE TO RELATED APPLICATIONS

Not applicable.

TECHNICAL FIELD

The concepts described herein relate to wireless network systems and using end user correlating data records to detect correctable conditions in the network.

BACKGROUND OF THE INVENTION

Wireless network providers are providing subscribers with many more and more complicated applications than ever. These applications can result in subscribers calling customer care centers when those applications do not function properly or do not function at all. The cause of these malfunctions can be misprovisioned handsets, core network DNS servers, radio access network ("RAN") or core network elements managing session policies, out of date information in the hand set, or incompatibility between the hand set configuration and the new application. The incompatibility can arise because of old versions of operating systems or applications residing on the handsets or because the network is unaware of the capabilities of the particular handset.

Network Element Management Systems ("EMSes") and network monitoring systems provide general standard specified messages (e.g., attachment failure) that do not describe the failure specifically enough to allow correction without trouble shooting by a customer care representative. Further, the error messages do not contain any correlation to complete subscriber identities, locations or physical/logical network elements.

Without specific information on the nature of the failure and correlation with subscriber and location information, it is impossible for the network to detect and correct these type failures on its own without intervention. If the network were able to collect specific information about network activity (access, core, IP transport, or application services) and were able to correlate that information to specific subscribers and locations, the network would be able to take action to correct those failure, and even to anticipate problems and react proactively to address those problems before a failure occurs.

BRIEF SUMMARY OF THE INVENTION

The concepts described herein relate to a system for collecting data records which have been correlated to subscriber, or end user, information, referred to as end user correlated data records, or as hybrid data records, and utilizing those records in the network to address correctable conditions in the network. The system includes at least one probe that taps an interface or software agent in the network which is able to monitor network activity and provide detailed data records on that activity. These data records provide the specific data required to determine the cause of a failure and not just that a failure occurred. These data records are sent to a mediation device that correlates those data records with subscriber identities (phone number or IP address, for example) and/or location data (cell ID, base station, or cable modem, for example), to create the end user correlated data records. An intelligent application services device takes the end user correlated data records and examines the records to determine if there are any correctable conditions in the network or the end user devices. If a correctable condition is detected the intelligent application services device can then trigger the appropriate action in the network. The appropriate action may include reprovisioning the end user device or renegotiating parameters (e.g. quality of service attributes, or radio interface type, for example) in the network.

The intelligent application services device used to detect correctable conditions includes a data record receiver to receive data records from the mediation device, a repository for storing the end user correlated data records, a analysis module which detects and determines correction information for failures or quality enhancement attributes in the network, and a non-fault detection module to identify and determine correction information for conditions which may cause failures in the network.

A method for identifying correctable conditions in the network is also described. The method includes creating data records reflecting activity in the network and correlating the data records with end user information. The end user correlated data records are then used to determine whether correctable conditions exists in the network. The method can also respond to the determination of a correctable condition by determining and sending triggers and correction information to the network elements, routers/switches, application servers, or end user device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 3 is a flow chart illustrating a method according to the concepts described herein.

DETAILED DESCRIPTION OF THE INVENTION

Figure 1:
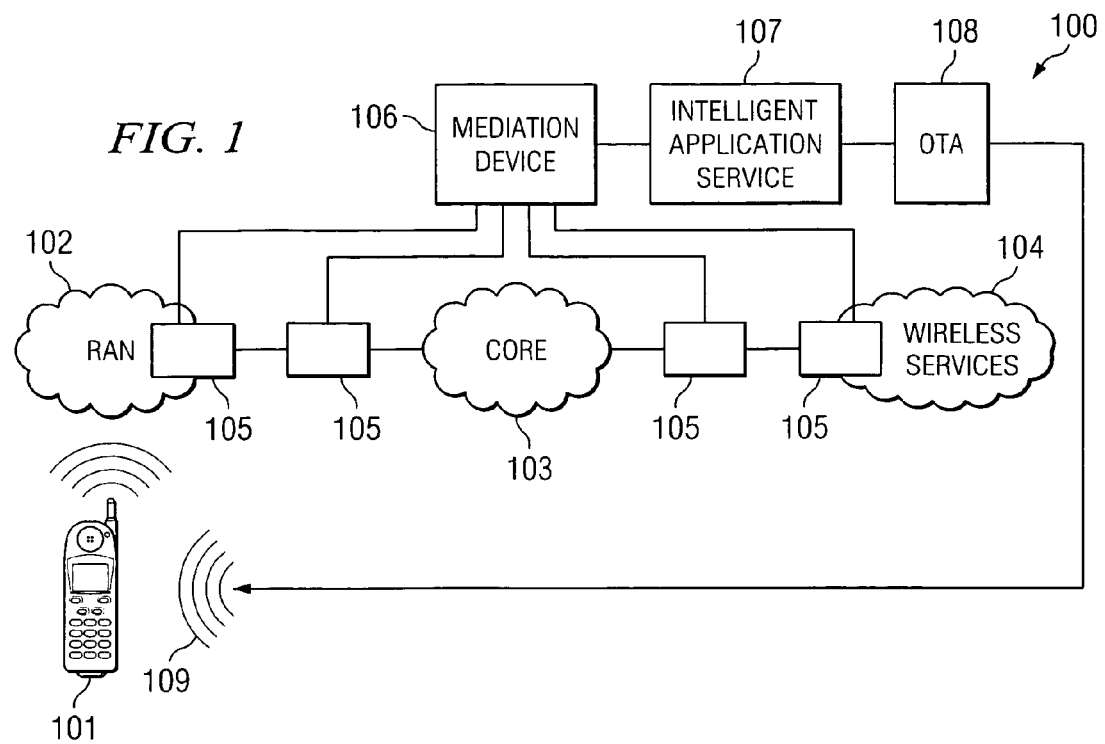
FIG. 1 is a simplified network diagram using a wireless network to illustrate the concepts described herein.

Referring now to FIG. 1, a simplified diagram of a wireless network in accordance with the concepts described herein is shown. Network 100 includes radio access network ("RAN") 102, which is a wireless network that can utilize any number of wireless and network protocols such as General Packet Radio Services ("GPRS"), or Universal Mobile Telecommunications Service ("UMTS"), or Global System for Mobile Communications ("GSM") or Code Division Multiple Access ("CDMA"), or Evolution Data Optimized ("EVDO"), or other wireless protocol. RAN 102 connects to core network 103 which can comprise the Serving GPRS Support Node ("SGSN") and the Gateway GPRS Support Node ("GGSN"). The SGSN is operable to take Internet Protocol ("IP") packets and put them into frames that the radio interface of RAN 102 can then download to mobile devices such as mobile device 101. While network 100 is shown as including a wireless network, RAN 102, to illustrate the concepts described herein, any wireless or wireline network, such as DSL, cable, etc. can be used without departing from the scope of the concepts described herein.

Core network 103 allows mobile devices to access wireless services 104 from the RAN 102. Wireless services 104 can encompass any type of wireless service for both enterprise and public domains. Examples of wireless services include, but are not limited to, browsing such as HTTP and email, Wireless Access Protocol ("WAP"), Multimedia Message Service ("MMS"), streaming video, audio, or any other present or future wireline and wireless services.

As can be seen from FIG. 1, a mobile device 101 communicates with RAN 102. RAN 102 assigns a radio link to mobile device 101, and then mobile device 101 launches its mobility management where it authenticates and identifies itself in RAN 102. Once mobile device 101 is known to the network and access has been granted, mobile device 101 launches its service management features and client applications, such as "push-to-talk" functions, micro-browsers or the like. When mobile device 101 launches an application such as a browsing application a direct link is established between mobile device 101 and the appropriate service in wireless services 104 though RAN 102 and core network 103. RAN 102 and core (including transport, i.e. IP, ATM, etc.) network 103 provide the quality of service required of the application being run, such as guaranteed or pseudo-guaranteed quality of service for streaming applications, and possibly best efforts for browsing and email.

In accordance with the concepts presented herein, probes 105 are connected at various points in network 100. FIG. 1 shows an embodiment where probes are connected inside RAN 102 and wireless services 104, between RAN 102 and core network 103, and between core network 103 and wireless services 104. Probes 105 passively monitor all the different interfaces between the various elements in real time. For example, a probe 105 in RAN 102 is able to detect radio link information, mobility information, and session management information passing inside RAN 102. A probe 105 in wireless services network 104 would be able to monitor any of the IP type packets associated with any of the services being run in wireless services network 104. Probes 105 monitoring traffic in and out of core network 103 are able to detect quality of service settings and other information from the core. Additionally, probes or software agents residing in border, or edge routers in the transport network may be used to monitor network traffic.

Information from probes 105 is sent to mediation device 106, which in one embodiment can be a product called DATA CAST™ from Tektronix. The information from probes 105 is used to create a data record, for example information related to a transaction such as an HTTP "get" and then the response, and/or closure, would form a data record which contains information showing that there has been a request and whether the request failed or succeeded. The time stamped data record is utilized by mediation layer 106 where the data record is correlated with the information on the subscriber (IMSI, or MSISDN or IP address, for example), the cell (the base station, the radio network controller ("RNC"), or other relevant network elements), and what part of the network the data record originated from. This allows mediation device 106 to perform correlation for subscriber identities plus location. This correlation should all be done within microseconds of the completion of the transaction. The information sent to mediation device 106 can be collected from data records from RAN, core network, transport, or application service interfaces, or from other collection devices such as network elements or software agents that reside on network elements, routers, or application servers.

Being able to correlate the data record with subscriber and location information, as is done in mediation device 106, allows network 100 to address problems that currently require human intervention, such as a subscriber call to customer service. For example, if a subscriber wants to access a new video service, MMS or even browsing, the mobile device, such as mobile device 101, sends a request to access an Application Point Name ("APN"). Within core network the GGSN must resolve this APN name such that it has to be associated to this service management request. The APN is a domain name similar to a URL and it could be, for example, cingular.mms.com. If the APN is misspelled or not provisioned correctly, then the request from the mobile device will fail. A probe 105 in network 100 sees the failure of the session management procedure and requests a data record, which is sent to mediation device 106. Mediation device 106 correlates the data record with subscriber and location information. According to the concepts described herein, the data record(s) and associated information, which can be referred to as a hybrid data record ("HDR"), are sent to intelligent application service ("IAS") 107.

IAS 107 operates to examine the error condition contained in the HDR and determine if the error was caused by a problem correctable by reprovisioning the mobile device using existing over-the-air ("OTA") systems. Using the example above, if IAS 107 determines that the error was caused by a misspelled APN such as singular.mms.com, IAS 107 can detect the misspelling and send a correction to mobile device 101 using OTA 108. OTA 108 can send a short messaging system ("SMS") message to mobile device 101 which corrects the spelling of the APN in the service application that was using the misspelled APN.

While the example described above uses a misspelling APN, one skilled in the art will understand that the concepts described could apply to correct any error or condition, particularly errors and conditions occurring in the level three network layer which can be identified by the data record and correlated to a subscriber and location. Such errors and conditions could include, but in no way are limited to, old APNs which have been reconfigured by the provider, misprovisioned applications, obsolete software in the mobile device that is unable to run the requested service, adjusting quality of service requirements when moving between uncongested and congested cells, radio access types (GSM, UMTS, UMA, Wi-Fi, etc.), pooled network nodes (such as BSC, RNC, SGSN), etc.

OTA system 108 is a currently installed OTA system existing in current wireless networks. These OTA systems are currently used to push messages to mobile devices such as time update information, welcome messages in new cities and the like. OTA system 108 is operable to upload software, correct problems and/or install new services. The concepts described herein utilize the OTA system to, via the network, download, reprovision and/or correctly provision the mobile device.

Having data records that describe wireless services currently being used and correlating that information to a subscriber and location, such as is done by mediation device 106, allows IAS 107 to perform other functionality not necessarily related to errors. For example, a subscriber may be using mobile device 101 to stream video clips. When mobile device 101 launches a video steaming application RAN 102 and core network 103 negotiate the services. During this negotiation, the quality of service profile is negotiated and agreed upon. For web browsing or email it may be best effort, however, for an application that requires real-time or near real time service, like an interactive voice or video service, for example, the requirements of the application and mobile device must be examined to determine the appropriate bearer quality to allow the subscriber to see clean video instead of a chopping or blocking video stream. Network 100 is able to determine that based on the subscriber information, i.e. application, equipment, location, etc., that this profile should be able to maintain itself for the duration of the video stream. However, when mobile device 101 is moving and changing from cell A to cell B and cell B is significantly more congested than cell A, network 100 may not be able to maintain a constant bit rate to mobile 101.

Ideally, network 100 would be able to maintain the bit rate in the transition from cell A to cell B, however it cannot be guaranteed. A renegotiation of the quality of service, or bit rate or CODEC, to allow for the video to continue uninterrupted, but at perhaps slightly less resolution or frame rate may need to be performed. Network 100 has previously been unable to accommodate the circumstance described above. However, with the monitoring probes, mediation device and intelligent application service described herein, IAS 107 is able, using the HDRs from mediation device 106 to monitor the radio network where it can monitor, or observe, the radio link parameters in real time, and can then recognize the degradation and trigger negotiation of the new service profile quality to be used by mobile device 101 and network 100. In this example, the IAS does not initiate a reprovisioning of mobile device 101; instead it may interface into another system, such as wireless services 104, that may be associated with this video download.

The concepts described herein can be used to provide real time information to these more advanced services to allow them to start the negotiation or reprovisioning, to anticipate and prevent problems such as loss of quality of service, or service altogether. This type of use case allows network 100 to maintain the best possible content that the subscriber can still be charged for, otherwise if the session drops and the subscriber calls customer service, the provider may opt to not charge the subscriber for the services or may even credit the subscriber for a day's service. If the bearer quality cannot be delivered at a guaranteed level, IAS 107 can provide a call detail record to the billing system allowing the provider to reduce the charge for the delivered content. Also, IAS 107 can send a trigger to a short messaging system or other messaging system that alerts the subscriber as to the reason the delivery quality was impacted. This messaging can be important if the subscriber roams into a foreign network whose access, core network and/or transport network is inferior to the home network.

Yet another example of a use case which illustrates concepts described herein involves maintaining the mobile devices such that the mobile devices are capable of running the most current services the provider is trying to provide. In any provider network there are potentially thousands of different configurations of handsets using different operating systems, in addition to different application or browser versions. When a subscriber or provider launches a new service, the provider would prefer that all the handsets in the network were correctly provisioned for these new services that the provider is trying to sell. The specific phone that identifies a subscriber is called an International Mobile Subscriber Identity ("IMSI"). The type of terminal equipment or type of handset is described as the International Mobile Equipment Identity ("IMEI"). That information, in addition to the MMS and the browser versions, equipment brand and model, and similar information are contained within a profile describing the subscriber.

This subscriber and equipment information is correlated to these application services so that the provider's server then knows what format of the new application to download. IAS 107 is able to provide information to the provider network on the handset detection and configuration. For example if the subscriber wishes to subscribe to a new service, the provider, using information provided by IAS 107 can detect that the operating system is not the most current version and may not be able to run the service, the subscriber may try to access the new service and fail because of the operating system. If the provider is able to detect this issue IAS 107 could instruct OTA system 108 to download the most current version of the operating system. Additionally, if a subscriber has just signed up for service with a provider IAS 107 can detect the equipment information and this information could be used to allow the provider representative with information that shows what features and services are available to sell to the subscriber.

Figure 2:
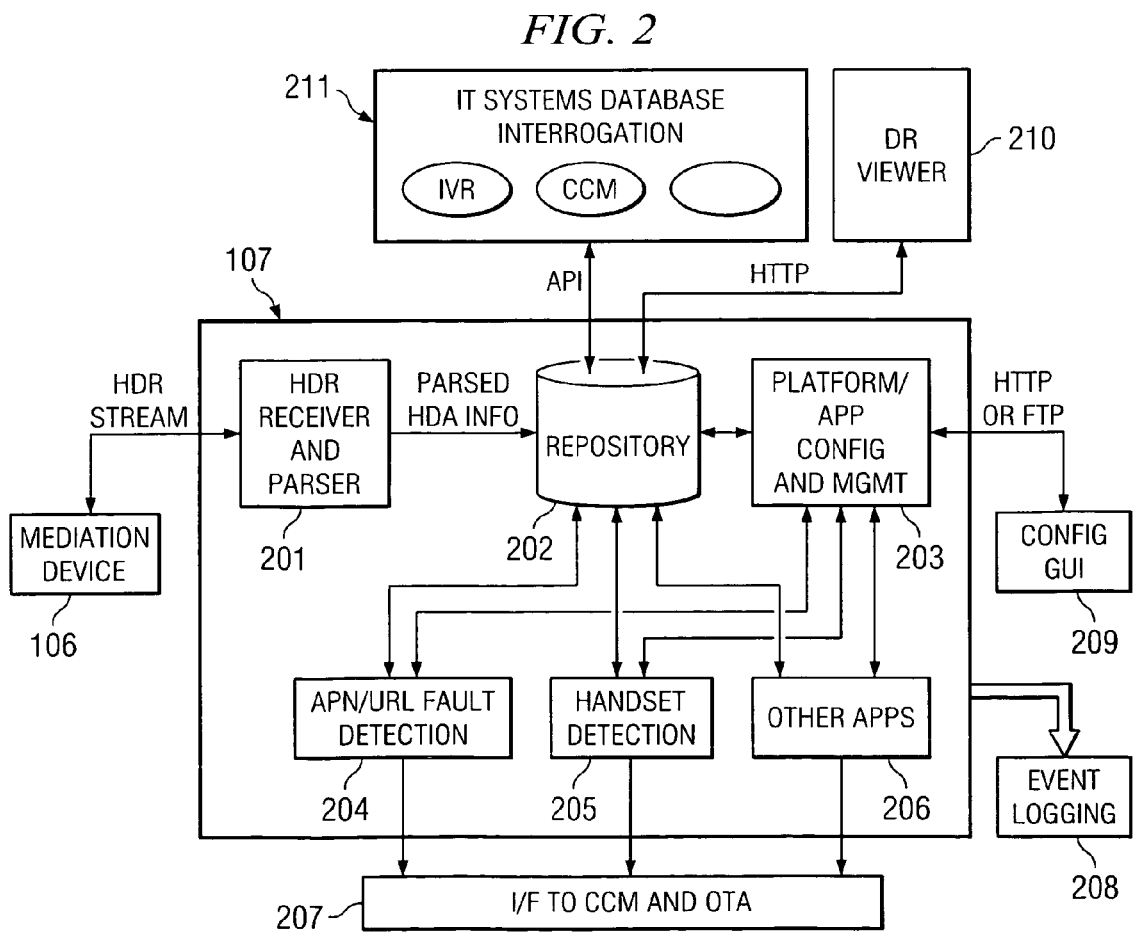
FIG. 2 is a block diagram of the intelligent application service shown in FIG. 1.

Referring now to FIG. 2, a block diagram of an embodiment of IAS 107 from FIG. 1 is shown. As discussed with respect to FIG. 1, IAS 107 communicates in one embodiment using a socket interface with mediation device 106 and receives a stream of hybrid data records or HDRs. Those HDRs contain data records from probes 105 from FIG. 1 and correlated subscriber and location information provided by mediation device 106. The HDRs are received at IAS 107 by HDR receiver 201. HDR receiver is responsible for parsing/decoding the HDRs, monitoring the status of the communications socket with mediation device 107 and ensuring that a constant flow of HDRs is received on the socket. While IAS 107 is described as receiving HDRs, IAS 107 can receive other types of information as well, such as SQL queries or other application programming interfaces ("APIs").

If the communications socket experiences an error or HDRs stop flowing, HDR receiver 201 will report this to a system log which can be viewed by a network administrator using graphical user interface ("GUI") 209. In the event of a communications loss between mediation device 106 and IAS 107, HDRs may be buffered on mediation device 106. When communication is restored, current HDRs will begin to stream to HDR receiver 201 and the buffered data can be sent in parallel. HDR receiver 201 can be configured to provide a check for late arriving HDRs by comparing the time stamp in the HDR with the time on IAS 107. If the HDR is older than a predetermined period, the HDRs are marked as late and stored. Late HDRs would not normally be used to trigger an action by IAS 107.

HDR receiver 201 is also responsible for parsing or decoding the HDRs. During decoding HDR receiver 201 checks for late arrival and also checks for fault conditions such as unexpected parameters, and missing or faulting parameters in the HDRs. If any of the events occur the event is reported to event logging 208.

When HDR receiver 201 parses the HDRs it will store all pertinent information in a structured repository 202. HDR will be stored in repository 202 for a configurable length of time, which can typically be 30 days. HDR information can be aggregated over a variety of dimensions including time. This allows system administrators to effectively follow-up on any actions taken by IAS 107 using the OTA 108 from FIG. 1. Using the HDR information from repository 202, administrators can follow up with individual subscribers or groups of subscribers, investigate subscriber complaints, or investigate new patterns for improperly configured mobile devices. Access is provided through HDR viewer 210.

Configuration status module 203 is operable to configure IAS 107 and to perform tasks related to the operation of the other modules of IAS 107. Configuration status module 203 can be operable to check the subscription status when a MSISDN that is unknown to the system is received. The MSISDN may be queried against an external database which can provide subscription information in response to the query. Configuration status module 203 can also act to control the number of reconfiguration triggers sent to OTA 108 from FIG. 1. The control can be to the IAS as a whole or can be done on a subscriber or event basis. This feature prevents IAS 107 from sending multiple reconfigure messages in response to multiple failed attempts from a mobile device. Once the first reconfigure message is sent configuration status module 203 prevents further messages from being sent in response to the same failure for a certain amount of time.

Fault detection module 204 responds to errors in APN or URL addresses coming from mobile devices. As described, the APN or URL could be misspelled or it could be an old name where the operator reconfigured, or it could be an IP address that is improperly associated to the APN. When an SGSN queries the DNS and it returns with the wrong IP address, this results in a failure. The failure record comes to IAS 107 and then fault detection module 204 will examine the faulty APN or URL. Fault detection module determines if the APN or URL was misspelled or had been reconfigured, and determines what the correct APN or URL should be. Once fault detection module has determined the correct configuration, that information is sent through OTA interface 207 to OTA 108 from FIG. 1 which then sends the correction to the mobile device.

Handset detection module 205 is used to provide the analysis and triggers for non-error conditions such as those described with respect to FIG. 1. Handset detection module 205 can detect parameters associated with mobile devices that would be incompatible with requested services, such as old versions of operating systems or software, and trigger the OTA to provide the proper version to the mobile device through a trigger sent through interface 207. Other Application module 206 can be configured to provide other services and triggers using OTA interface 207 as are appropriate for conditions and errors detected by IAS 107 using the HDRs.

Integration module 211 allows IAS 107 to be integrated with external IT systems such as customer care management ("CCM") and integrated voice response ("IVR") systems.

Referring now to FIG. 3, a flow chart showing a method according to the concepts provided herein is described. Method 300 begins in process 301 by creating a data record reflecting activity on the network. Process 301 then passes to process 302 where the data record reflecting the network activity is correlated with subscriber and location information associated with the network activity, thereby creating a hybrid data record. The hybrid data record is examined to see if there are any fault or error conditions associated with the network activity in process 303. If there is a fault or error, process 304 determines the cause of the fault and if the fault is correctable, the method passes to process 305 which sends a trigger and correction information to an OTA system which then sends the correction to the appropriate device.

Returning to process 303, if a fault condition is not detected the method passes to process 306 which determines if a non-fault condition is present such as quality of service issues or mobile device compatibility issues related to requested or desired services. If an non-fault condition is present, process 307 determines the appropriate action to be taken and process 308 sends a trigger and action to the network to perform the appropriate action such as renegotiation of quality of service or having the OTA system download appropriate software or configuration to the mobile device.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for collecting and utilizing end user correlated data records in a network, said network comprising a wireless network and a packet data network, wherein said wireless network and said packet data network are different networks, said system comprising:
   at least one probe in the wireless network;
   at least one probe in the packet data network;
   wherein the probes are operable to collect data records containing information related to network activity on the wireless network and the data network and user devices, said activity pertaining to at least one of a request for or provision of a data service that is hosted by said packet data network which is desired by a given end user's wireless device that is communicatively coupled to said wireless network;
   a mediation device in communication with the probes, the mediation device associating end user information with the collected data records pertaining to the given end user, thereby producing end user correlated data records; and
   an intelligent application services device receiving the end user correlated data records from the mediation device and examining the end user correlated data records to determine if there are correctable conditions in the network or user devices.

2. The system of claim 1 wherein the intelligent application services device sends a trigger and correction information to the network in response to the detection of a correctable condition.

3. The system of claim 2 wherein the trigger and correction information are sent to the network.

4. The system of claim 2 wherein the trigger and correction information are sent to an over the air system which send the correction information to the user device.

5. The system of claim 1 wherein the intelligent application services device further comprises a repository storing the end user correlated data records, a fault module operable to detect and correct fault conditions detected in the network, and a non-fault detection module operable to identify and correct non-fault conditions in the network or user device.

6. The system of claim 5 wherein fault conditions are conditions in the network that result in a failure of the data service desired by the given end user.

7. The system of claim 5 wherein non-fault conditions are conditions relating to configuration of the given end user's wireless device that is not compatible with the data service.

8. The system of claim 5 wherein the intelligent application services device further comprises a end user correlated data records receiver module to receive and parse the end user correlated data records.

9. A method for detecting correctable conditions in a network, said network comprising a wireless network and an Internet Protocol (IP) network, the method comprising:
creating data records reflecting activity in the wireless network and IP network for a data service that is hosted by said IP network which is desired by an end user's wireless device that is communicatively coupled to said wireless network;
correlating the data records with end user information; and
determining whether a correctable condition exists in the network based on the end user correlated data records.

10. The method of claim 9 further comprising sending a trigger and correction information in response to a determination of a correctable condition.

11. The method of claim 9 wherein the correctable condition is a fault condition.

12. The method of claim 9 wherein the correctable condition is a non-fault condition.

13. The method of claim 9 wherein probes in the network are used to create data records, a mediation device connected to the probes correlates the data records with end user information, and an intelligent application services device determines whether a correctable conditions exists.

14. The method of claim 13 wherein the intelligent application services device further comprises a repository storing the end user correlated data records, a fault module operable to detect and correct fault conditions detected in the network, and a non-fault detection module operable to identify and correct non-fault conditions in the network or user device.

15. An intelligent application services device comprising:
an end user correlated data records receiver module to receive and parse end user correlated data records, wherein said end user correlated data records correlate end user information for a given end user with data records reflecting activity in a wireless network and an Internet Protocol (IP) network, said activity pertaining to at least one of a request for or provision of a data service that is hosted by said IP network which is desired by the given end user's wireless device that is communicatively coupled to said wireless network;
a repository storing the end user correlated data records;
a fault module operable to detect and determine correction information for fault conditions detected in at least one of the wireless network and the IP network; and
a non-fault detection module operable to identify and determine correction information for non-fault conditions in at least one of the networks or user device.

16. The device of claim 15 wherein fault conditions are conditions in at least one of the wireless network and the IP network that result in a failure of data service desired by the given end user.

17. The device of claim 15 wherein non-fault conditions are conditions relating to configuration of the given end user's wireless device that is not compatible with said data service.

18. The device of claim 15 further comprising an interface to send trigger and correction information in response to detection of a correctable condition.

19. The system of claim 2 wherein the intelligent application services device autonomously sends the trigger and correction information without requiring user interaction.

20. The method of claim 13 wherein the mediation device autonomously performs the correlating the data records with end user information; and wherein the intelligent application services device autonomously performs the determining.

21. The device of claim 15 wherein the fault module is operable to detect and determine said correction information for fault conditions based at least in part on said end user correlated data records.

22. The device of claim 15 wherein the non-fault detection module is operable to identify and determine the correction information for non-fault conditions based at least in part on said end user correlated data records.

23. The system of claim 1 wherein said packet data network comprises an Internet Protocol (IP) network.

24. The system of claim 1 wherein said data service comprises at least one of web browsing, email, wireless access protocol (WAP) application, multimedia message service (MMS), streaming video, and streaming audio.

25. The method of claim 9 wherein said data service comprises at least one of web browsing, email, wireless access protocol (WAP) application, multimedia message service (MMS), streaming video, and streaming audio.

26. The device of claim 15 further comprising:
said non-fault detection module operable, responsive to determination that a negotiated quality of service for provision of the desired data service to the wireless communication device is no longer appropriate, to renegotiate quality of service for continued provision of the desired data service to the wireless communication device.

27. The device of claim 26 wherein the determination that the negotiated quality of service for provision of the desired data service is no longer appropriate results from movement of the wireless communication device within the wireless network to a cell that is unable to maintain the negotiated quality of service for continued provision of the desired data service.

* * * * *